(12) United States Patent
Hwang et al.

(10) Patent No.: US 8,665,823 B2
(45) Date of Patent: Mar. 4, 2014

(54) METHOD AND ENTITIES FOR INTER-DOMAIN HANDOVER

(75) Inventors: Woonhee Hwang, Espoo (FI); Frank Mademann, Teltow (DE); Jari Mutikainen, Lepsämä (FI); Curt Wong, Sammamish, WA (US)

(73) Assignee: Nokia Siemens Networks Oy, Espoo (FI)

( * ) Notice: Subject to any disclaimer, the term of this patent is extended or adjusted under 35 U.S.C. 154(b) by 149 days.

(21) Appl. No.: 12/922,759

(22) PCT Filed: Mar. 23, 2009

(86) PCT No.: PCT/EP2009/053371
§ 371 (c)(1),
(2), (4) Date: Sep. 28, 2010

(87) PCT Pub. No.: WO2009/121745
PCT Pub. Date: Oct. 8, 2009

(65) Prior Publication Data
US 2011/0013597 A1    Jan. 20, 2011

Related U.S. Application Data

(60) Provisional application No. 61/041,557, filed on Apr. 1, 2008.

(51) Int. Cl.
*H04W 4/00* (2009.01)
(52) U.S. Cl.
USPC .......................................................... 370/331
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/395.53, 412–421, 431–457, 458–463, 370/464–497, 498–522, 523–520, 521–529
See application file for complete search history.

(56) References Cited

U.S. PATENT DOCUMENTS

| | | | |
|---|---|---|---|
| 7,382,750 B2 * | 6/2008 | Wu | 370/331 |
| 8,005,076 B2 * | 8/2011 | Gallagher et al. | 370/353 |
| 8,072,933 B2 * | 12/2011 | Marinescu et al. | 370/331 |
| 2003/0207688 A1 | 11/2003 | Nikkelen | |
| 2006/0239229 A1 * | 10/2006 | Marinescu et al. | 370/331 |
| 2008/0026752 A1 * | 1/2008 | Flore et al. | 455/435.2 |
| 2009/0086674 A1 * | 4/2009 | Ejzak | 370/331 |

FOREIGN PATENT DOCUMENTS

| | | |
|---|---|---|
| CN | 1199511 C | 4/2005 |
| CN | 1770908 A | 5/2006 |
| EP | 1821552 | 8/2012 |

OTHER PUBLICATIONS

Chinese Office Action (with full English translation) dated Jan. 4, 2013, for corresponding Chinese Application No. 200980111902.X.

* cited by examiner

*Primary Examiner* — Jung-Jen Liu
(74) *Attorney, Agent, or Firm* — Squire Sanders (US) LLP

(57) ABSTRACT

Aspects of the present invention relate to methods and entities involved in enabling and improving inter-domain handover. A PS based RAN such as eUTRAN can identify which potential handover to prepare and which handover to initiate, PS-PS or SR-VCC based on: (1) the UE's SR-VCC capabilities, (2) "SR-VCC indication" from the MME, (3) active VoIP bearer, and (4) target cell capabilities.

8 Claims, 6 Drawing Sheets

METHOD AND ENTITIES FOR INTER-DOMAIN HANDOVER

FIELD OF THE INVENTION

The present invention generally relates to methods and entities for inter-domain handover.

BACKGROUND

Mobile communication has made considerable progress in recent years. Starting from a traditional circuit switched (CS) approach as e.g. pursued in the Global System of Mobile Communication (GSM), the technological evolution has made its way towards packet switched (PS) systems such as those operating for example on the basis of the Internet Protocol (IP). Examples of such communication systems are the Universal Mobile Telecommunication Standard (UMTS) also referred to as Third Generation (3G) telecommunication system, or a system known as IMS system (IP Multimedia System), or a network operating on the basis of the Session Initiation Protocol SIP. UMTS is not necessarily operating based on IP, it has a PS domain that is more powerful than GSM's PS domain and therefore it can support VoIP. UMTS provides also circuit switched services.

While in former systems, speech or voice was a main aspect of "media" as payload data to be conveyed via the communication system, nowadays all kind of media are focused on as payload, e.g. speech, music (audio), images (still images, i.e. pictures, as well as moving images, i.e. videos), executable program code, text data, and many other types or combinations of media types.

With the emerging development of new systems, those "old" and new systems coexist in parallel and interoperability is one aspect of the development. In particular in case of users (represented by their terminals, e.g. mobile stations MS in GSM or user equipment UE in UMTS and/or IMS) that may move and/or roam throughout the communication networks, the users expect seamingless services of high quality to be provided to them, irrespective of the current communication system in which they camp, i.e. irrespective whether the system is packet or circuit switched.

A call from/to a terminal represents a logical association between two endpoints, one of which being the terminal. These endpoints are often two terminals, but also the endpoints are terminal considered and the network. In the latter scenario, one side my be PS and one CS for an terminal to terminal connection. In a CS domain, the call relies on a bearer connection between the endpoints. Stated in other words, this means that service and almost physical channel description are combined to one CS service, while in PS with, e.g. SIP, the service control is to a large extent independent from how the bearer is provided. In a PS domain, the call relies on a session established between the endpoints. The PS, CS, or any call comprises signaling and payload (media) delivered, and thus a signaling part is established as well as a media part. Channel is rather physical and does not fit well for PS as both components of a PS call may be carried on the same physical channel. Each of those channels or parts, respectively, thus may in principle rely on PS or CS access domain. A domain as used herein denotes the communication principle applied, i.e. PS or CS, or more generally an underlying radio access technology RAT and not the geographical location. That is, within a single geographical location or area, both PS and CS domains may coexist. Inter domain HO is PS-CS handover and may be performed also without RAT change.

It is to be noted that the examples given in conjunction with the present invention are not intended to be limiting in any way. Rather, specific terminology as used in some passages in this document is adopted as an example only to simplify the description of the present invention and to illustrate a particular case to which the present invention may advantageously be applicable. This, however, is not intended to exclude any other field of application for the present invention.

A user equipment UE may be communicating in an area that can be denoted as cell in a PS domain of a network. When the UE is moving or roaming through the network, it may experience coverage problems which necessitate a change of a serving entity and specifically the need to change to an area that can continue to serve the communication by the CS domain only. In a PS domain, a serving entity is e.g. represented by a SGSN (Serving GPRS Support Node, GPRS=General Packet Radio Service). In a CS domain, a serving entity is e.g. represented by a MSC (Mobile Services Switching Center). Such change of serving entity is known as handover HO. In networks/areas in which PS domains as well as CS domains coexist, hitherto a handover (HO) had to be performed within the same domain so as to provide continuous service (intra-domain HO). With the increasing demand of users and the increasing roaming behavior of users, it is desirable that users may also be enabled to roam from a PS domain to a CS domain to thereby overcome the problem that there is no full coverage by both domains, e.g. the rollout of the PS coverage takes some time so that in the rollout area PS services can be provided. But when the UE leaves these areas it has to be served by more widely deployed CS services. Therefore the inter domain handover has to be accomplished. Under the above previous assumption, the service would have to be interrupted. It is therefore a need to provide for enablement of HO also between the domains, i.e. to provide for so-called inter-domain HO. One type of inter-domain HO is referred to as single radio voice call continuity, SR-VCC.

Work is ongoing to define single radio voice call continuity (SR-VCC) procedures in a further release of standards. SR-VCC is studied extensively and will be defined in a forthcoming standard. SR-VCC enables the UE to perform an inter-domain handover from PS domain (such as from a LTE (long term evolution) network "cell") to CS domain (such as to a GSM network cell), and vice versa. HO is performed such that signals from potential target neighbouring cells are measured by the roaming terminal in terms of the respective signal strength, the target cells are evaluated for being suitable, and finally a suitable target cell is selected and HO is initiated and performed thereto. As a result of the HO procedure, the terminal is then experiencing the services that are served by the new serving entity.

When moving the development further in such a direction towards inter-domain HO's, various problems arise that need to be solved in order to achieve the goal.

SUMMARY

It is hence an object of the present invention to provide for corresponding improvement in the hitherto known scenarios and to provide for a reliable inter-domain and/or inter-RAT handover.

This object is, for example, achieved by the measures as set out in the independent claims 1, 4, 7, 10, 11, 12, and 13, respectively. Advantageous further developments are defined in respective appropriate dependent claims.

According to exemplary embodiments of the present invention, this object is for example achieved by the following exemplary aspects of a method, and entities exemplarily embodying a respective aspect of the invention, as outlined herein below, together with respective individual further refinements of the above exemplary aspects:

X1. A (home subscriber server) apparatus and/or module, comprising:

a memory having datasets of subscribers registered therein, a respective dataset comprising an identification of the respective subscriber and a profile associated to the subscriber, the profile comprising at least an indication whether an inter-domain handover is permitted for the subscriber, a transceiver, configured to receive information and to send information, and a processor configured to write datasets into and read datasets from the memory, wherein the processor, responsive to receiving the information that a subscriber registered in the memory attaches to a network, reads out at least the indication whether an inter-domain handover is permitted for the subscriber.

X2. An apparatus/module according to aspect X1, wherein the transceiver is configured to send the indication whether an inter-domain handover is permitted for the subscriber to a mobility management entity of the network.

X3. An apparatus/module according to aspect X1, wherein the indication whether an inter-domain handover is permitted for the subscriber is stored per network to which the subscriber potentially roams.

Y1. A (mobility management entity) apparatus and/or module, comprising:

a transceiver, configured to receive information and to send information, wherein the transceiver, responsive to receiving an indication whether an inter-domain handover is permitted for a subscriber, is configured to send that indication to an access network in which the subscriber's terminal currently camps.

Y2. An apparatus/module according to aspect Y1, wherein the transceiver is configured to receive information indicating a type of handover to be performed for a respective subscriber, and further comprising a processor, responsive to an indication of the type of handover to be performed for a respective subscriber, and configured to perform a handover according to the indicated type of handover.

Y3. An apparatus/module according to aspect Y1, wherein the processor, according to the indicated type of handover, controls the transceiver to forward a handover request to an entity capable of handling a handover according to the indicated type.

Z1. An (eUTRAN) apparatus and/or module, comprising:

a transceiver configured to receive information and to send information, and a processor configured to process received information and to output processing results, wherein the processed information comprise at least an indication whether an inter-domain handover is permitted for a respective subscriber's terminal, an indication whether the subscriber's terminal is capable to participate in inter-domain handover, an indication whether respective access network entities are capable to participate in inter-domain handover and/or capable to handle packet switched services, an indication of the service domain of a service provided to a respective user's terminal in an ongoing session, wherein the processor is configured to output as a processing result, a list of target access network entities (cells) eligible in the network for handover for a respective user's terminal.

Z2. An apparatus/module according to aspect Z1, wherein the transceiver device is configured to send the list of target access network entities (cells) to the respective terminal that has the ongoing session (to derive information (measurements) about these).

Z3. An apparatus/module according to aspect Z2, wherein the transceiver device is configured to receive information on one or more selected access network entities (cells), and the processor is configured to instruct to initiate a handover of applicable handover type towards the selected access entity.

A1. A (terminal) apparatus and/or module, comprising:

a transceiver configured to receive a list of target access network entities;

a measurement module, configured to perform measurements on those target access network entities contained in the received list, and a processor, configured to send information (the measurements) to a (eUTRAN) apparatus/module.

B1. An (eUTRAN) apparatus and/or module, comprising:

a transceiver configured to receive information and to send information, and a processor configured to process received and the configured information and to output processing results, wherein the processed information comprise at least an indication whether an inter-domain handover is permitted for a respective subscriber's terminal, an indication whether the subscriber's terminal is capable to participate in inter-domain handover, an indication whether respective access entities are capable to participate in inter-domain handover and capable to handle packet switched services, an indication of the service type provided to a respective user's terminal in an ongoing session, and an indication of measurement results of measurements conducted on access entities wherein the processor is configured to output as a processing result, a selected access network entity elected by the eUTRAN/processor as handover target for a respective user's terminal and to instruct (the Mobility Management Entity) to initiate a handover of applicable handover type towards the selected access network entity.

C1. A method/computer program product aspect, comprising: enabling and improving inter-domain handover in a PS based RAN by identifying which potential handover to prepare and which handover to initiate, PS-PS or SR-VCC based on: (1) the UE's SR-VCC capabilities, (2) "SR-VCC indication" from the MME, (3) active VoIP bearer, and (4) target cell capabilities.

Stated in other words, according to at least an exemplary example of the invention, subsequently outlined scenarios are presented.

A HSS or similar subscriber database stores subscriber profiles, and the home operator provisions an indication such as e.g. "SR-VCC VDN" to each of the SR-VCC enabled subscribers. VDN is VCC domain transfer number. The HSS also contains a processing logic that, this "SR-VCC VDN" may or may not be downloaded to the serving entities of a network, depended on the location of the terminal, i.e. dependent on the visited network VPLMN currently used by the terminal, during attach procedure of the terminal to an LTE network (e.g. the MME of the LTE network) or also during inter network mobility. (Unlike the regular Dual Radio VDN, there is no need to deliver the SR-VCC VDN to the UE (e.g. via OMA DM).)

When "SR-VCC VDN" is downloaded from HSS to the MME during LTE attach as part of the subscriber data, this means that the home operator allows the subscriber's session to perform SR-VCC. The home operator can thereby ensure that the VCC application server (AS) will also be prepared and accept to execute domain transfer. If the home operator does not allow SR-VCC to be performed in a certain VPLMN, then the operator can restrict the "SR-VCC VDN" to be downloaded to that VPLMN. This applies in the same way for UEs in their home PLMN.

Once the MME receives the "SR-VCC VDN" for the subscriber being LTE attached, the MME can signal this "SR-VCC indication" information to the eUTRAN to indicate that for the UE it is eligible to perform SR-VCC. eUTRAN is also aware of the UE capabilities (e.g., whether the terminal is capable to perform SR-VCC or not) based on the UE capabilities information.

Using the MME provided "SR-VCC indication" and UE capabilities, and the awareness of VoIP bearer, eUTRAN can now determine whether or not to send the SR-VCC specific neighbouring cell list to the UE. In other words, eUTRAN can now identify which potential handover to prepare (e.g. by neighbour cell list tailoring) and which handover to initiate PS-PS or SR-VCC based on:

the UE's SR-VCC capabilities,
"SR-VCC indication" from the MME,
active VoIP bearer, and
target cell capabilities.

As a result of that mechanism for VoIP services:
when the chosen target cell does support VoIP the eUTRAN initiates a PS-PS handover (or network assisted cell change) regardless whether the VoIP service is eligible for SR-VCC or not. The eUTRAN indicates to the MME that a PS-PS handover shall be performed.

And, when the chosen target cell does not support VoIP and the VoIP session is eligible for SR-VCC, the eUTRAN initiates an SR-VCC handover and indicates this also to the MME, i.e. the eUTRAN indicates to the MME that the handover request shall be forwarded to an SR-VCC entity (e.g. a SR-VCC enabled MSC server) to become an SR-VCC handover and not as normal to a PS network entity for PS-PS handover.

As another exemplary embodiment, the above described mechanism may omit the specific handover preparation phase, i.e. there is no tailoring of the UE's neighbour cell list according to UE's and networks capabilities and also not depending on established VoIP. In that scenario, only the second phase, the selection of the target cell according to the mechanism described above is used. Then it continues as with the first exemplary embodiment, i.e. the eUTRAN selects from the non-tailored measured cells the target cell according to criteria 1) . . . 4) and derives from that also whether the handover shall become an SR-VCC or PS-PS handover, and the eUTRAN indicates this also to the MME whether the handover request shall be forwarded to an SR-VCC entity to become an SR-VCC handover and not as normal to a PS network entity for PS-PS handover.

Accordingly, by virtue of one or both of the above exemplary scenarios representing at least aspects of the invention, the following advantages can be achieved:

There is no new interface introduced for eUTRAN;
A specific SR-VCC neighbouring cell list can be created to handle SR-VCC eligible session and this is handled by eUTRAN;
If SR-VCC neighbouring cell list is not used, the eUTRAN can still select the target cell based on whether SRVCC is intended or not; or the eUTRAN determines the handover type to be performed (SR-VCC or PS-PS) based on the available target cells and their characteristics, MME mainly relays the information to eUTRAN, so that no new complex functionality has to be added;
A Home operator can now control in general for a vPLMN whether SR-VCC is allowed or not already at the HO preparation phase in the source RAN, instead of preventing it (i.e. SR-VCC) during the actual (ongoing) domain transfer, which would have already consumed a lot of signalling capacities at that (later) phase and may finally result in a rejection of HO if this type of handover is not allowed.

BRIEF DESCRIPTION OF THE DRAWINGS

The invention will be readily understood when read in conjunction with the accompanying drawings, which shows in FIG. 1 an overall high-level concept of single radio voice call continuity, SR-VCC, from eUTRAN to UTRAN/GERAN.

DESCRIPTION OF EXEMPLARY EMBODIMENTS

Figure 1:
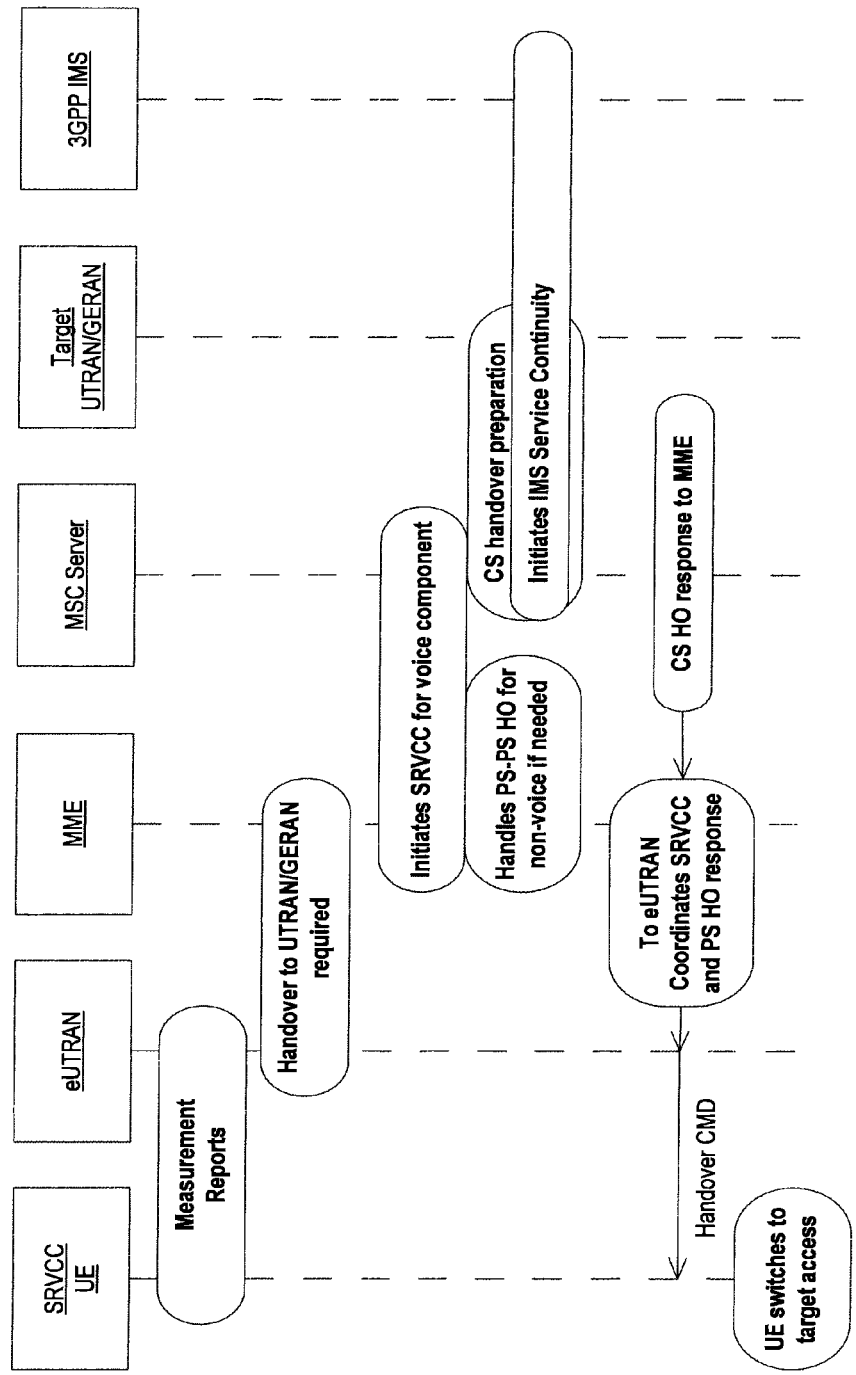

The present invention will be described herein below with reference to e.g. eUTRAN as an example of a PS domain network and to a UTRAN/GERAN as an example of a CS domain network. However, any other PS domain or CS domain based networks may equally be susceptible for the implementation of the present invention.

The present invention has been made in due consideration of the following:

Without SR-VCC, the eUTRAN will never trigger a HO to a 2/3G (G=generation) target cell that does not support a PS HO. In this case, the operator would not configure any "CS only" cells of the RAN (UTRAN or eUTRAN) as target cell.

With SR-VCC, the eUTRAN will also need to trigger HO to a target cell that can only support CS resources (i.e., no PS resource). This means the operator would have to configure (all) those cells as possible neighbour cell as well. This excessive SR-VCC neighbour list should, however, not be used by a UE that is not capable to perform SR-VCC (e.g., "PS only" enabled UE).

In case UE is capable to perform SR-VCC, the network may try to perform SR-VCC based on handover algorithms the network has (e.g. the currently established services of the UE, coverage, etc).

Applying similar consideration, if a VoIP session/service experienced by the UE is not suited for inter-domain handover from LTE/eUTRAN (PS domain) to CS domain, then the eUTRAN should not include CS cells in the neighbour list for the measurements to be conducted by the UE.

This means the eUTRAN needs to send different cell neighbour list depending on whether the session/UE is eligible for SR-VCC or not.

Alternatively, for simplicity of neighbour cell list management, i.e. in case eUTRAN doesn't want to utilize this session/UE SR-VCC capability information during measurement phase, at least, the eUTRAN should consider this information during HO decision to reduce the predictable HO failure (i.e. eUTRAN should not choose CS cell as a target in case the session or the UE is not SR-VCC capable or initiate an SR-VCC handover in case the available target cell supports no VoIP but CS services).

On the other hand, if a target cell supports VoIP, then eUTRAN would need to prevent SR-VCC from being performed in the network. Otherwise, the network (MME) may start SR-VCC to the target cell instead of PS-PS HO, which might result in failed handover or in an unnecessary domain change. This means the eUTRAN needs to indicate to the MME that an initiated handover implies SR-VCC or not, i.e. the eUTRAN needs to tell the MME whether the handover target for the VoIP bearer is CS or PS. From that the MME derives the need for a domain change (routing the handover to the MSC, i.e. to CS domain) or not (routing the handover to the SGSN, i.e. to and/or within PS domain).

So there are at least three aspects which the present invention addresses:

the eUTRAN needs to be able to detect the need and also the chance for initiating an SR-VCC handover, the eUTRAN should be able to tailor the UE's neighbour cell list specifically for potential SR-VCC handovers, and the eUTRAN needs to be able initiate an SR-VCC handover and has also to tell the MME whether a PS-PS or SR-VCC handover is initiated by the eUTRAN.

To select the appropriate target cell for inter-domain handover from LTE to CS, according to an exemplary embodiment, the UE first receives a list of potential target neighbouring cells from eUTRAN and then reports back to eUTRAN on their signal strengths in the measurement report. eUTRAN then decides whether inter-domain handover from LTE to CS (SR-VCC) is started or not. In a modification thereof, the target cell list for the UE is not tailored but the eUTRAN still decides whether inter-domain handover from LTE to CS (SR-VCC) is started or not based on the measurement reports and the above outlined criteria of:

the UE's SR-VCC capabilities,
"SR-VCC indication" from the MME,
active VoIP bearer, and
target cell capabilities.

FIG. 1 shows an overall high level concept of single radio voice call continuity, SR-VCC from e.g. eUTRAN to UTRAN/GERAN. Entities involved in such concept are denoted as boxes in horizontal direction, and actions performed/signalling exchanged between those entities are indicated in rounded boxes in vertical direction.

Entities involved are a user's terminal such as a user equipment UE that is enabled to perform SR-VCC. This is denoted as SR-VCC UE. An evolved UTRAN is shown as an evolved universal terrestrial radial network eUTRAN. This eUTRAN is illustrated as a single apparatus/module only, since its internal constitution is not of particular interest for the present invention. Generally, any access network such as a radio access network RAN and as also the present illustrated eUTRAN consist of access entities and a controlling entity controlling the access entities. For example, according to GSM, the access network AN and/or radio access network RAN is formed by a plurality of base stations BS controlled by a base station controller BSC. In UMTS, for example, the radio access network RAN is constituted by a plurality of Node_B's and a radio network controller RNC.

Further illustrated is a mobility management entity MME. This MME entity and/or apparatus/module is shown as a separate entity but can also form part of eUTRAN. However, in connection with the present invention, the MME is considered separately.

Furthermore, an MSC server is illustrated as an entity representing the circuit switched, CS, domain. Likewise, a target UTRAN/GERAN is illustrated, for which the same observations as above with regard to eUTRAN are applicable in terms of its internal construction.

Last but not least, a 3GPP IMS apparatus is shown representing a packet switched, PS, domain in conjunction with the eUTRAN.

Not shown in this Figure is a subscriber database such as a home subscriber server HSS (when referring to UMTS/IMS) or a home location register HLR when referring to GSM, for example. Aspects of the invention associated with such subscriber database are discussed later with reference to other Figures.

As shown, the SR-VCC enabled terminal SR_VCC UE is reporting measurement reports to the eUTRAN. On the basis thereof, the eUTRAN may decide whether a handover is required and if so, whether a handover to UTRAN/GERAN is required. This decision is taken/realized by the eUTRAN in cooperation with the mobility management entity MME. The MME, in turn, initiates the SR-VCC service for the voice component in cooperation with the MSC server. Also, the MME, if need is, handles an intra-domain handover within packet switched PS domain for non-voice related media carried in the session. On the other hand, the MSC server prepares for the handover to the circuit switched domain for voice components of the session, e.g. in case VoIP is carried in the session. Also, the MSC server initiates continuity for the IMS services in cooperation with the 3GPP IMS.

After CS handover preparation, the MSC server sends a circuit switched, CS, handover, HO, response to the MME entity. The MME entity forwards this to the eUTRAN and in cooperation therewith coordinates the SR-VCC and packet switched handover response, if any. Subsequently, the handover command is sent from eUTRAN to the SR-VCC enabled user equipment S-VCC UE which finally switches to the target access entity selected for handover.

Figure 2:
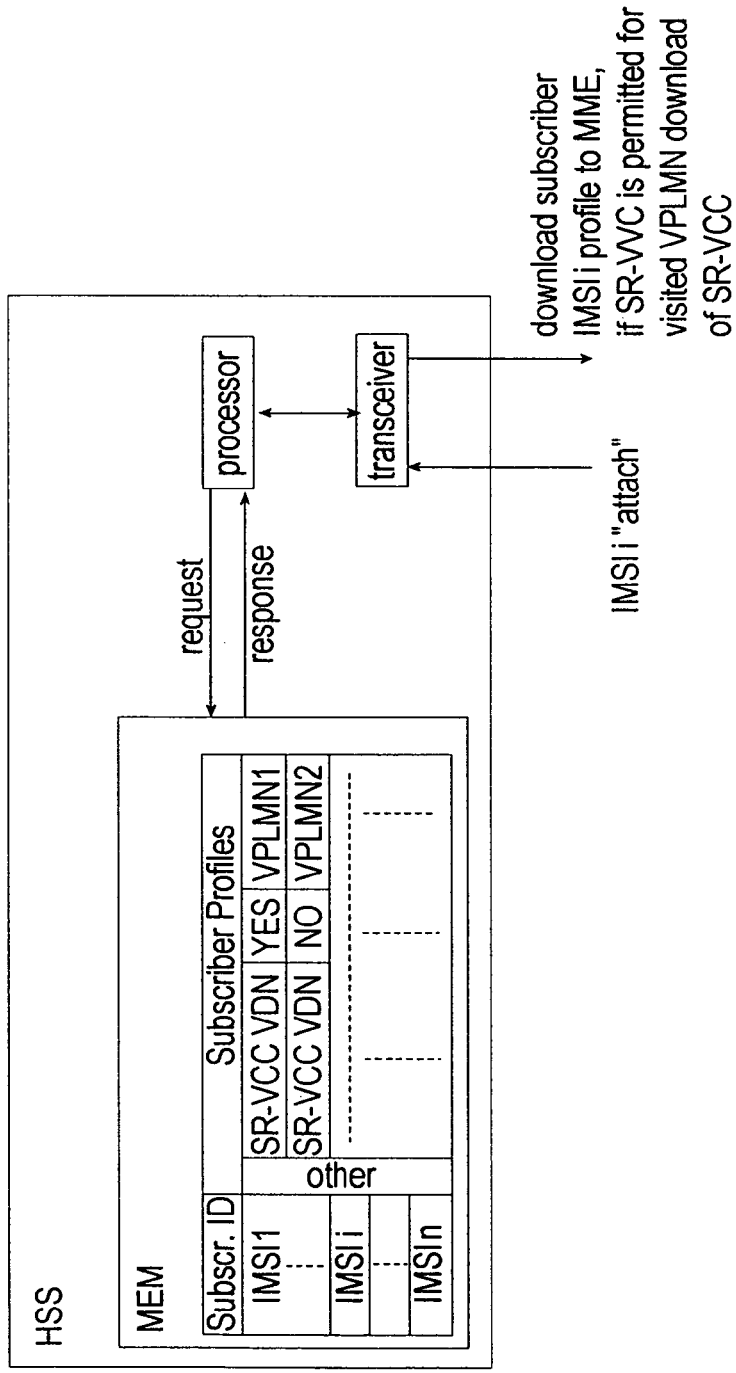
FIG. 2 a simplified block diagram of a possible constitution of a home subscriber server, HSS, as an aspect related to one or more aspects of the present invention.

FIG. 2 illustrates a simplified block diagram of a possible constitution of a subscriber database such as a home subscriber server HSS involved under an aspect related to one or more aspects of the present invention.

As shown, the HSS comprises a memory, a processor, and a transceiver. The memory is accessible by the processor. The processor may thus write data into (operator controlled) as well as request data to be read out, and read data out of the memory. The processor exchanges data with the transceiver. The transceiver constitutes the interface of the subscriber database HSS with the "external world", i.e. remaining network entities and apparatuses.

The memory comprises datasets of subscribers registered in the memory and thus in the network. A respective dataset of a subscriber comprises an identification of the respective subscriber, e.g. by use of his international mobile station identity (IMSI) number. As shown in FIG. 2, the memory comprises n data sets of n subscribers identified by their respective IMSI denoted as IMSI1 . . . IMSIiIMSIn. Also, each respective dataset comprises a profile associated to the subscriber. Such profile, among other properties or subscription details, comprises at least an indication whether an inter-domain handover is permitted for the subscriber. As illustrated in FIG. 2, this is indicated by indicating the SR-VCC VDN (single radio voice call continuity VCC domain transfer number) for a respective subscriber. In addition, the indication whether an inter-domain handover is permitted for the subscriber (apart form being identified by the SR-VCC VDN) is stored per network to which the subscriber potentially roams. Thus, for example for subscriber identified by IMSI1, it is indicated (YES) for an SR-VCC VDN for VPLMN1 so that the inter-domain handover is permitted in the visited network 1, while no SR-VCC VDN is for example indicated for a second visited network VPLMN2 for that subscriber. Similar data entries/datasets are registered in the memory for the other subscribers up to the n-th subscriber. Also, more than two data entries for visited networks are of course possible per subscriber dataset. The illustrated example has just been limited to two visited networks to keep the drawings and explanations simple. Note that a similar entry is also provide for the subscribers in relation to their home network HPLMN. Thus, if the processor requests a profile for a subscriber identified by its IMSI from the memory MEM, then MEM responds with the profile. The subscriber ID is e.g. the IMSI, and the response is MSISDN, together with "SRVCC VDN" if Yes is indicated for the subject VPLMN (e.g. VPLMN1 in the illustrated example for IMSI 1).

Writing of datasets via the processor to the memory is performed by the network operator. Reading out of datasets is performed during the operation of the subscriber terminal in the network, e.g. for registration, authorization and/or accounting purposes. Readout is performed responsive to corresponding requests.

In relation to the present invention, in particular, the processor is responsive to receiving an information that a respective subscriber who is registered in the memory attaches to a network, e.g. to his home network or to a visited network. Responsive thereto, the processor reads out at least the indication whether an inter-domain handover is permitted for the subscriber. Dependent on the data structure, it is possible to read out also the indication whether an inter-domain handover is permitted for the subscriber in the particular network to which he attaches and to which and/or in which he potentially roams or is already present. This indication whether inter-domain handover is permitted is then read out and transferred (downloaded) to a mobility management entity.

Figure 3:
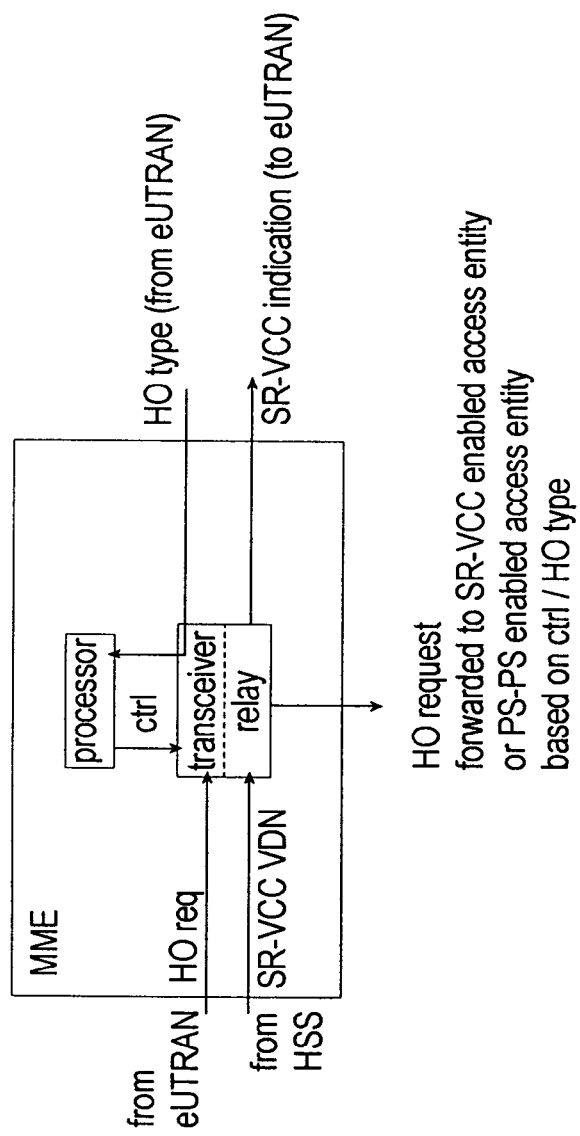
FIG. 3 a simplified block diagram of a mobility management entity, MME, as an aspect related to one or more aspects of the present invention.

FIG. 3 shows a simplified block diagram of such a mobility management entity MME as an aspect related to one or more aspects of the present invention.

The MME has a transceiver capable of receiving messages and sending messages. Some messages are received and sent immediately without further processing so that they are merely relayed. The mobility management entity MME has also a processor which controls the transceiver. The transceiver of the MME is responsive to receipt of an indication whether an inter domain handover is permitted for a subscriber and configured to send/relay that indication to an access network in which the subscriber's terminal currently camps.

Furthermore, the transceiver is also configured to receive information indicating a type of handover to be performed for a respective subscriber, and wherein the processor of the MME, responsive to that indication of the type of handover to be performed for a respective subscriber, is configured to perform a handover according to the indicated type of handover. This means, that the processor of the MME controls the transceiver to forward a handover request (received from an access network such as eUTRAN) to an entity capable of handling a handover according to the indicated type. This means that in case of a SR-VCC handover, a handover request is forwarded to the MSC, while in case a packet switched to packet switched (PS-PS) handover is requested, the handover request is forwarded to a serving GPRS support node SGSN.

Figure 4:
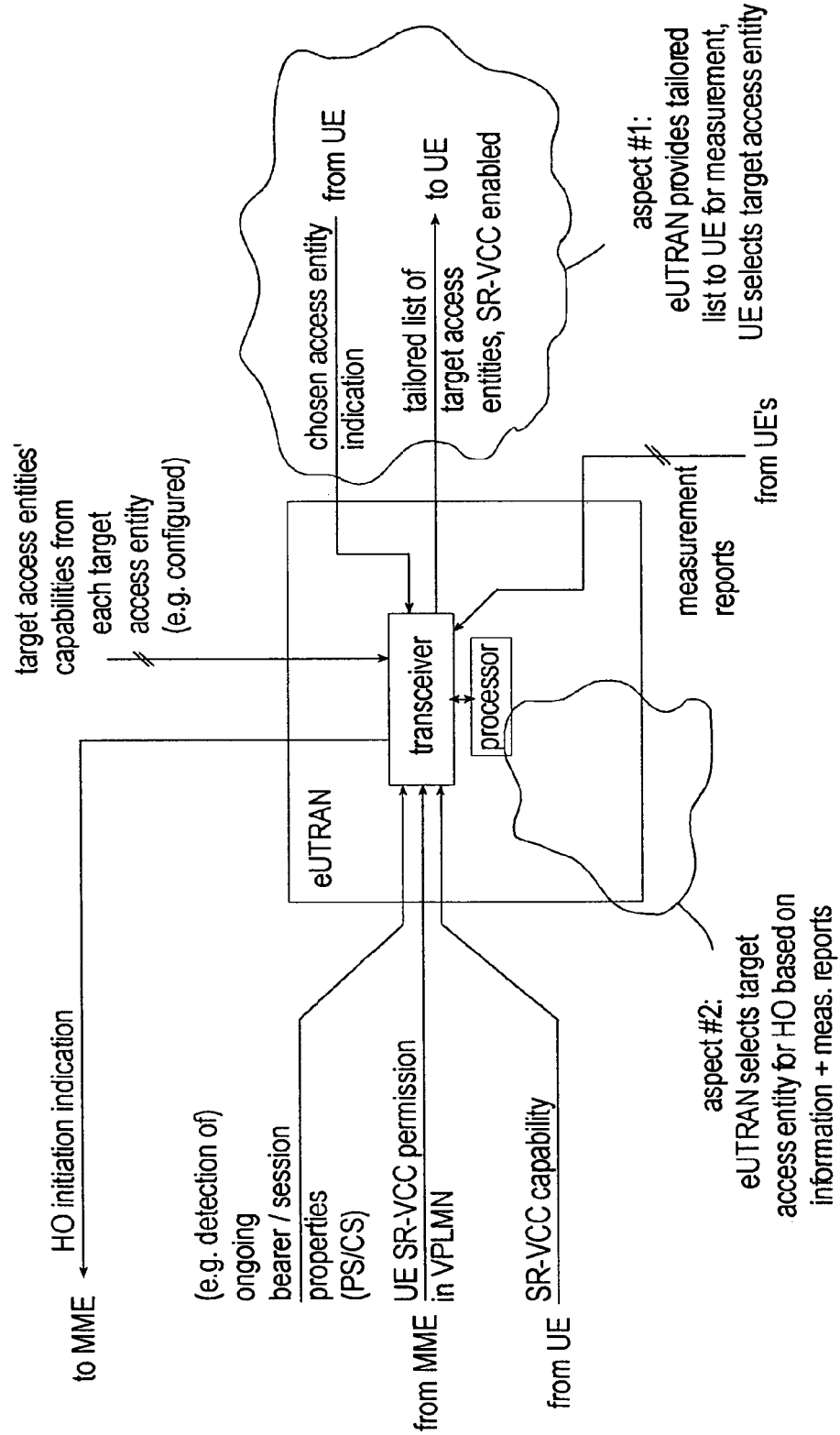
FIG. 4 a simplified block diagram of an evolved universal terrestrial radio access network, eUTRAN, as an aspect related to one or more aspects of the present invention.

FIG. 4 is a simplified block diagram of an evolved universal terrestrial radio access network eUTRAN under an aspect related to one or more aspects of the present invention. As mentioned before, the internal constitution of the eUTRAN as an example in the present case is not of so much importance for the present invention in regard of the Node_B's and/or radio network controllers it comprises. Rather, the eUTRAN is regarded as a "black box" comprising an apparatus and/or module at an arbitrary location within the eUTRAN that is configured to perform the respective tasks in connection with the present invention.

Notwithstanding the above, the eUTRAN, in relation to an aspect of the present invention, comprises a transceiver configured to receive information and to send information. Information is received from various origins and sent to various destinations. Furthermore, the eUTRAN can be assumed to comprise a processor that is configured to process the received information and to output corresponding processing results. Also, the processor may process information that is configured in the apparatus/module and not received information.

As shown in FIG. 4, the received and/or processed information may comprise at least:

an indication whether an inter-domain handover is permitted for a respective subscriber's terminal; such information is received from a MME apparatus/module explained herein above;

an indication whether the subscriber's terminal is capable to participate in an inter-domain handover; such information is received for example from the user equipment, e.g. via the MME which forwards it further to the eUTRAN upon communication setup of the terminal UE; and an indication whether respective access entities are capable to participate in inter-domain handover and/or capable to handle packet switched services; (this information is an example of information that is rather configured in the apparatus/module and not received information; however, if configured information is stored remotely, it may also be regarded as being transmitted to and thus received by the processor); those access entity capabilities are also referred to as target cell capabilities; a target cell may correspond to the geographical coverage area of an access entity such as a Node_B or base station or WLAN access node for example. The respective target cell capabilities are reported from each access entity to the transceiver/processor. Under a specific aspect related to the present invention, the transceiver may also receive an indication of the chosen target cell/access entity that was chosen from a user's terminal such as user equipment UE.

Furthermore, the transceiver/processor of the eUTRAN receives and is aware of the service domain of a service provided to a respective user's terminal in an ongoing session. That is, the eUTRAN is aware whether the bearer established for an ongoing session for a respective user is a packet switched bearer and whether the services conveyed thereon are eligible to be handed over to the circuit switched domain. Such an indication is rather at least based on/derived from a detection that an ongoing session is suited for or requiring a domain change; it is derived for example from the QoS of the ongoing session that it is VoIP; the current domain should be clear, it is PS.

This is in particular the case for the voice over IP, VoIP services, but other services may also be susceptible and eligible for being carried on a circuit switched connection rather than in a packet switched session. Since the eUTRAN is aware of all cells/access entities constituting the eUTRAN, based on the above-listed received information, the processor of the eUTRAN, in a specific aspect of the present invention, is configured to output as a processing result a list of target access entities that are eligible in the network for handover for a respective user's terminal. Stated in other words, depending on the circumstances, different user terminals receive different target entity lists for handover. Such respective list is sent from the transceiver device of the eUTRAN to the respective terminal that has the ongoing session.

Of course, if such a list is sent towards a terminal, such a terminal apparatus has corresponding capabilities and/or is equipped with a module comprising a transceiver that his configured to receive a list of target access entities eligible in the network for handover by the terminal, and a measurement module, configured to perform measurements on those target access entities that are contained in the received list. What is actually measured is for example received signal strength, e.g. RSSI (received signal strength indicator) for communication between an access entity and the terminal, or an error rate such as bit error rate BER, or a signal to noise ratio S/N, or the like. The terminal responds back to the eUTRAN on the measured signal strength on each of the target access entities that it could measure.

In turn, the eUTRAN apparatus/module comprises the transceiver device that is also configured to receive such information on the selected access entity. Responsive thereto, the processor of the eUTRAN apparatus/module is configured to instruct to initiate a handover of an applicable handover type towards the selected access entity.

Under a different aspect in relation to the present invention, it is not necessary to tailor the user equipment's neighbour cell list or target cell list as described herein above. Under such a scenario, the eUTRAN apparatus comprises a transceiver configured to receive information and to send information and also a processor configured to process the received information and to output processing results. Likewise, as under the previous aspect, the received information comprises at least an indication whether an inter-domain handover is permitted for a respective subscriber's terminal, an indication whether the subscriber's terminal is capable to participate in inter-domain handover, an indication whether respective access entities are capable to participate in inter-domain handover and/or capable to handle packet switched services, and an indication of the services provided to a respective user's terminal in an ongoing session. Under the presently described aspect, in addition thereto, the received information comprises an indication of the measurement results of measurements conducted on access entities, wherein the processor is configured to output, as a processing result, a selected access entity selected in the network eUTRAN for handover for a respective user's terminal and configured to instruct to initiate a handover of applicable handover type towards the selected access entity.

Under the above-described first aspect/scenario, the measurements are conducted by the user equipment on a restricted/tailored number of target cells, while under the second aspect, the user equipment conducts its measurements on all potential target cells/access entities. Under the first aspect, the selection of the target cell/access entity is performed by the user equipment and informed to the eUTRAN apparatus, while under the second aspect, the decision is taken by the eUTRAN apparatus/module itself.

Under the first aspect, the user equipment has a reduced burden for measurements to be conducted and reported, while it has the additional burden of making a proper selection. Under the second aspect, the user equipment has additional burden on performing/reporting more measurements of target cells/potential access entities while it is relieved from the burden of making a target cell selection as this is moved towards the eUTRAN.

FIG. 5 shows a flowchart of methods applicable under aspects of the present invention for the processing performed by the eUTRAN.

Figure 5A:
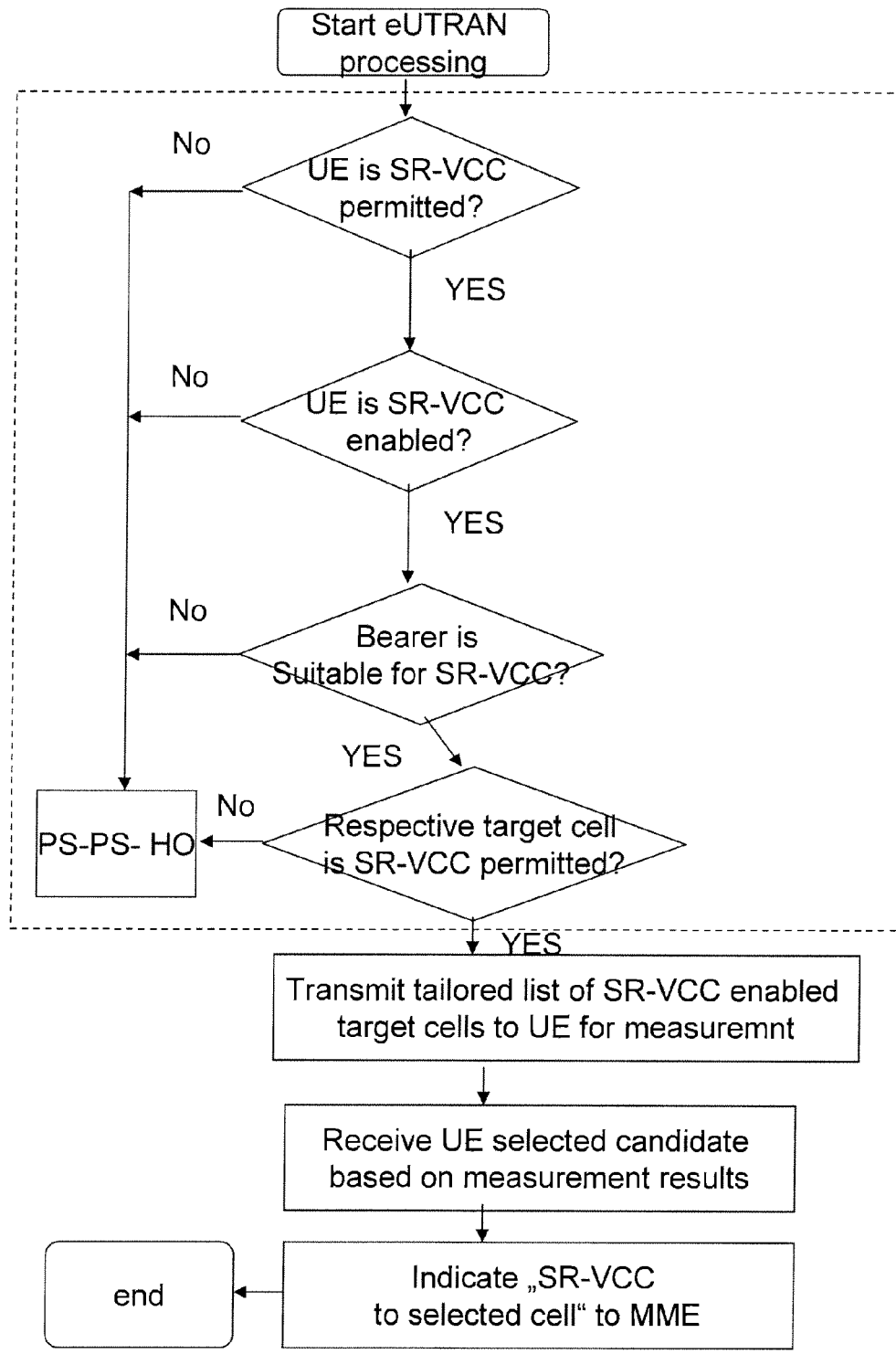
FIGS. 5A&B flowcharts of processings performed at a processor of the eUTRAN according to aspects of the invention.

FIG. 5A shows a processing under the above mentioned first aspect. After eUTRAN processing starts, it is checked whether the UE is permitted for SR-VCC (based on e.g. the SR-VCC indication received from the MME). If not (NO), then the processing branches to a step which defines intra-domain HO, i.e. PS-PS-HO for the session/UE under consideration. If YES, it is checked (e.g. based on UE capabilities reported) whether the UE is capable to participate in a SR-VCC HO. If not (NO), then the processing branches to a step which defines intra-domain HO, i.e. PS-PS-HO for the UE under consideration. If YES, it is checked whether the bearer/session is suitable for SR-VCC HO, e.g. if the bearer carries VoIP (i.e. e.g. a speech application). If not (NO), then the processing branches to a step which defines intra-domain HO, i.e. PS-PS-HO for that UE's session under consideration. If YES, it is checked whether a respective potential HO target cell is permitted or enabled to participate in SR-VCC. If not (NO), then the processing branches to a step which defines intra-domain HO, i.e. PS-PS-HO for that target cell under consideration; the checked target cell is then not included in a tailored target cell. If YES, the potential target cell is included in a tailored list of target cells that are SR-VCC enabled/permitted for the current VPLMN the UE is camping in, the UE as such, the session as such and the cell as such. That tailored list is transmitted to the UE for measurements. After the measurements, the eUTRAN receives the US selected candidate for HO based on the measurement results. Then, eUTRAN indicates to the MME that a SR-VCC is to be performed to the selected cell, i.e. the access entity representing such cell. Then, the process related to this aspect of the invention ends, and a SR-VC HO is possible to be performed in such situation.

Note that the checking steps can also be performed in a different sequence that deviates from the illustrated and described one. This, however, has no influence on the present invention. In this scenario, eUTRAN first determines the type of HO, i.e. intra-domain (PS-PS) or inter-domain SR-VCC (i.e. PS-CS), and subsequently, the UE selects the access entity/cell to which HO is to be performed.

Figure 5B:
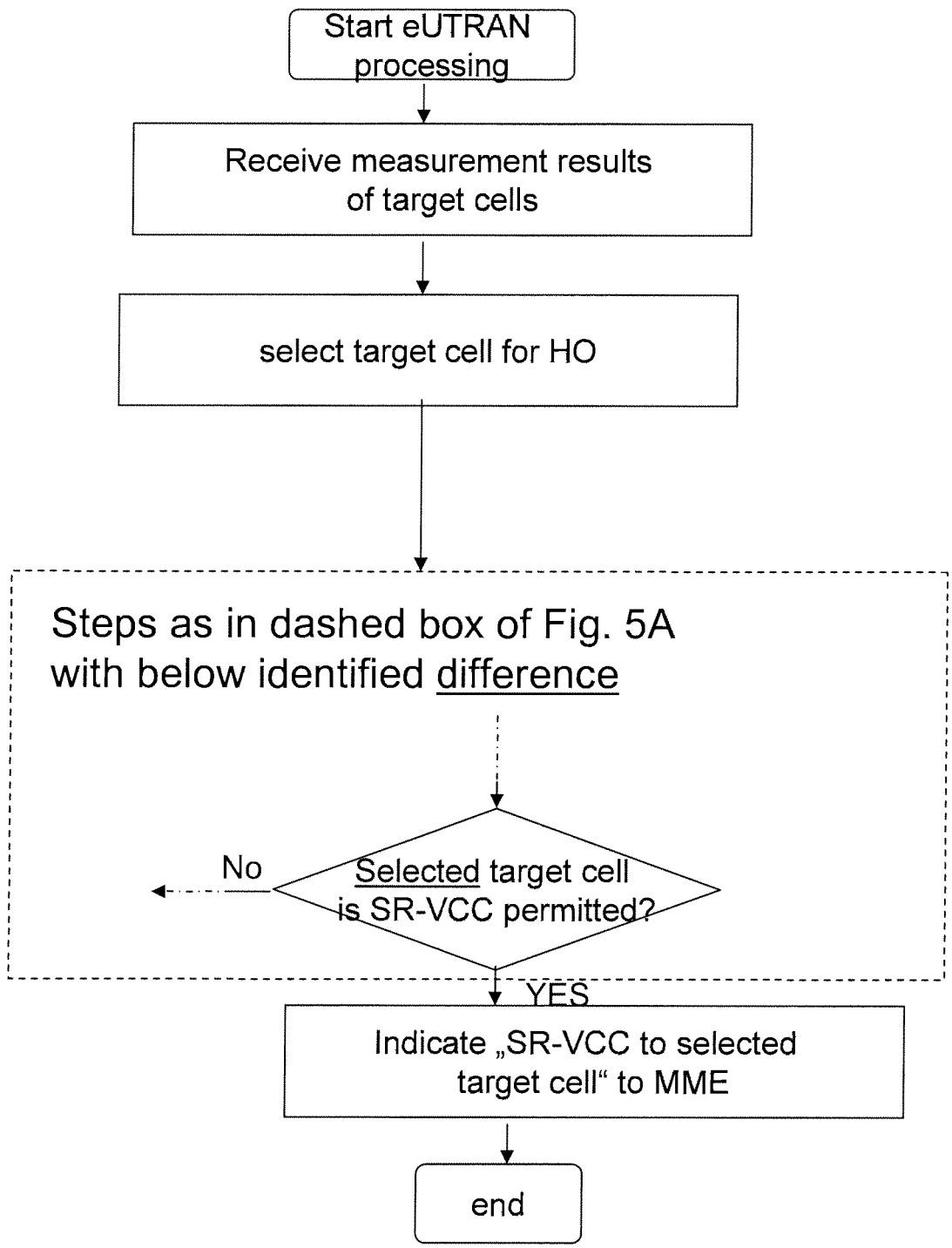

FIG. 5B shows a processing under the above mentioned second aspect. After eUTRAN processing starts, eUTRAN receives the measurement result of all measured potential target cells, i.e. access entities representing a respective cell. Then, based on the measurement results, eUTRAN selects a target cell/access entity for HO. After that, the checking steps as in FIG. 5A are performed by eUTRAN (only in the step of checking whether a target cell is SR-VCC permitted, in FIG. 5B the selected cell is checked, while in FIG. 5A scenario, each respective potential cell is checked). Then, if YES, eUTRAN indicates to the MME that a SR-VCC is to be performed to the selected cell, i.e. to the access entity representing such cell. Then, the process related to this aspect of the invention ends, and a SR-VC HO is possible to be performed in such situation.

Note that the checking steps can also be performed in a different sequence that deviates from the illustrated and described one. This, however, has no influence on the present invention. In this scenario, eUTRAN first selects the access entity/cell to which HO is to be performed and subsequently, eUTRAN determines the type of HO, i.e. intra-domain (PS-PS) or inter-domain SR-VCC (i.e. PS-CS) to be performed.

Hence, FIGS. 5A and 5B illustrate as a further exemplary aspect of the invention a method and/or computer program product aspect, comprising: enabling and improving inter-domain handover in a PS based RAN by identifying which potential handover to prepare and which handover to initiate, PS-PS or SR-VCC based on checking: (1) the UE's SR-VCC capabilities, (2) "SR-VCC indication" from the MME, (3) active VoIP bearer, and (4) target cell capabilities.

For the purpose of the present invention as described herein above, it should be noted that 1) although acronyms as used herein may have the subsequently indicated meaning, the acronyms are used only to illustrate and denote a specific scenario to which the present invention is applicable; notwithstanding this, the invention is applicable to other scenarios in which entities involved may have different names and be denoted using different acronyms, and/or in which signaling or protocol names are different, List of Acronyms and Respective Meaning:
SR-VCC—single radio voice call continuity
CS—circuit switched
PS—packet switched
LTE—long-term evolution
HO—handover
UE—user equipment
VoIP—voice over IP
IP—Internet Protocol
MME—mobility management entity
MSC—mobile services switching centre
SGSN—serving GPRS support node
GPRS—general packet radio service
PLMN—public land mobile network
HPLMN—home PLMN
VPLMN—visited PLMN, visited network,
DTM—dual transfer mode
RAN—radio access network
VDN—VCC domain transfer number
HLR—home location register
HSS—home subscriber server
RAT—radio access technology
EPS—evolved packet system
IMS—IP Multimedia Subsystem
eUTRAN—evolved UTRAN
UTRAN—universal terrestrial radio access network
RAN—radio access network
AS—application server
GERAN—GSM EDGE RAN
GSM—global system of mobile communication
EDGE—enhanced data rates for GSM evolution
OMA—open mobile alliance
DM—dual mode
1xCS—The 3GPP2 legacy circuit Switched signalling system
IWS—Interworking solution 2) (Apart from Acronym Usage):
an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; the above technologies are wireless access technologies, e.g. in different radio spectra, which permit roaming of the user, i.e. of his terminal, respectively, access technology in the sense of the present invention may also imply packet switched, e.g. IP, based access technologies but also circuit switched CS access technologies;

access technologies may be distinguishable in at least two categories or access domains such as packet switched and circuit switched, but the existence of more than two access domains does not impede the invention being applied thereto, an access network or entity thereof may be any device, unit or means by which a station, entity or other user equipment may connect to and/or utilize services offered by the access network; such services include, among others, data and/or (audio-) visual communication, data download etc.; an access entity may for example be a base station under GSM or a Node_B under UMTS;

a user equipment may be any device, unit or means by which a system user may experience services from an access network such as a mobile phone, personal digital assistant PDA, or computer, or even a module or chip-card to be inserted in one of the above;

method steps likely to be implemented as software code portions and being run using a processor in a network or at a network element or terminal, are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, or units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

in addition, any method steps and/or devices, units or means likely to be implemented as software components may for example be based on any security architecture capable e.g. of authentication, authorization, keying and/or traffic protection;

devices, units or means can be implemented as individual devices, units or means, but this does not exclude that they are implemented in a distributed fashion throughout the system, as long as the functionality of the device, unit or means is preserved.

Although the present invention has been described herein before with reference to particular embodiments thereof, the present invention is not limited thereto and various modification can be made thereto without departing from the scope of the invention.

We claim:

1. An apparatus, comprising:
a memory having datasets of subscribers registered therein, a respective dataset comprising an identification of the respective subscriber and a profile associated to the subscriber, the profile comprising at least an indication of whether a single-radio voice call continuity handover is permitted for the subscriber, a transceiver, configured to receive information and to send information, and a processor configured to write datasets into and read datasets from the memory, wherein the processor, responsive to receiving the information that a subscriber registered in the memory attaches to a network, reads out at least the indication whether a single-radio voice call continuity handover is permitted for the subscriber, and the transceiver is configured to send the indication whether a single-radio voice call continuity handover is permitted for the subscriber to a mobility management entity of the network, and the indication whether a single-radio voice call continuity handover is permitted for the subscriber is stored per network to which the subscriber attaches.

2. An apparatus, comprising:

a transceiver, configured to receive information and to send information, wherein the transceiver, responsive to receiving an indication of whether a single-radio voice call continuity handover is permitted for a subscriber, is configured to send that indication to an access network in which the subscriber's terminal currently camps, and the transceiver is configured to receive information indicating a type of handover to be performed for a respective subscriber, and the apparatus further comprising a processor, responsive to an indication of the type of handover to be performed for a respective subscriber, is configured to perform a handover according to the indicated type of handover, wherein the processor, according to the indicated type of handover, controls the transceiver to forward a handover request to an entity capable of handling a handover according to the indicated type.

3. An apparatus according to claim 2, wherein, if the indicated type of handover is a single-radio voice call continuity handover, the transceiver forwards the handover request to a mobile services switching center, and if the indicated type of handover is a packet-switched to packet-switched handover, the transceiver forwards the handover request to a serving-GPRS-support node.

4. An apparatus, comprising:

a transceiver configured to receive information and to send information, and a processor configured to process received information and to output processing results, wherein the processed information comprise at least
an indication of whether a single-radio voice call continuity handover is permitted for a respective subscriber's terminal,
an indication of whether the subscriber's terminal is capable to participate in single-radio voice call continuity handover,
an indication of whether respective access network entities are capable to participate in single-radio voice call continuity handover and/or capable to handle packet switched services,
and an indication of the service domain of a service provided to a respective subscriber's terminal in an ongoing session, wherein the processor is configured to output as a processing result, a list of target access network entities eligible in the network for handover for a respective subscriber's terminal, and the transceiver device is configured to send the list of target access network entities to the respective terminal that has the ongoing session.

5. An apparatus according to claim 4, wherein the transceiver device is configured to receive information on one or more selected access network entities, and the processor is configured to initiate a handover of applicable handover type towards the selected access entity.

6. An apparatus, comprising:

a transceiver configured to receive information and to send information, and a processor configured to process received and configured information and to output processing results, wherein the processed information comprise at least
an indication of whether single-radio voice call continuity handover is permitted for a respective subscriber's terminal,
an indication of whether the subscriber's terminal is capable to participate in single-radio voice call continuity handover,
an indication of whether respective access entities are capable to participate in single-radio voice call continuity handover and capable to handle packet switched services,
an indication of the service type provided to a respective subscriber's terminal in an ongoing session, and
an indication of measurement results of measurements conducted on access entities wherein the processor is configured to output as a processing result, a selected access network entity elected by the processor as a handover target for a respective subscriber's terminal and to initiate a handover of applicable handover type towards the selected access network entity, and the indication whether a single-radio voice call continuity handover is permitted for the subscriber is stored per network to which the subscriber attaches.

7. A method, comprising: enabling inter-domain handover in a packet-switched based radio access network by identifying which potential handover to prepare and which handover to initiate, between either of PS-PS or single-radio voice call continuity, wherein the identifying is based on checking: (1) the UE's single-radio voice call continuity capabilities, (2) single-radio voice call continuity indication from the mobility management entity, (3) active voice-over-internet-protocol bearer, and (4) target cell capabilities, and a processor is configured to output, as a processing result, which potential handover to prepare and which handover to initiate.

8. A computer program product, embodied on a non-transitory computer readable medium, comprising software code portions, which, when executed by a processor, enable inter-domain handover in a packet-switched based radio access network by identifying which potential handover to prepare and which handover to initiate, between either of PS-PS or single-radio voice call continuity, wherein the identifying is based on checking: (1) the UE's single-radio voice call continuity capabilities, (2) single-radio voice call continuity indication from the mobility management entity, (3) active voice-over-internet-protocol bearer, and (4) target cell capabilities, and the processor is configured to output, as a processing result, which potential handover to prepare and which handover to initiate.

* * * * *

UNITED STATES PATENT AND TRADEMARK OFFICE
CERTIFICATE OF CORRECTION

| | | |
|---|---|---|
| PATENT NO. | : 8,665,823 B2 | Page 1 of 1 |
| APPLICATION NO. | : 12/922759 | |
| DATED | : March 4, 2014 | |
| INVENTOR(S) | : Hwang et al. | |

It is certified that error appears in the above-identified patent and that said Letters Patent is hereby corrected as shown below:

IN THE CLAIMS

In claim 8, at column 16, line 48, cancel the text beginning with "8. A computer program" to and ending "to initiate." in column 16, line 61, and insert the following claim:

--8. A computer program product, embodied on a non-transitory computer readable medium, comprising software code portions, which, when executed by a processor:
    enable inter-domain handover in a packet-switched based radio access network by identifying which potential handover to prepare and which handover to initiate, between either of PS-PS or single-radio voice call continuity, wherein the identifying is based on checking:
        (1) the UE's single-radio voice call continuity capabilities,
        (2) single-radio voice call continuity indication from the mobility management entity,
        (3) active voice-over-internet-protocol bearer, and
        (4) target cell capabilities; and
    configure the processor to output, as a processing result, which potential handover to prepare and which handover to initiate.--

Signed and Sealed this
First Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 8,665,823 B2
APPLICATION NO. : 12/922759
DATED : March 4, 2014
INVENTOR(S) : Hwang et al.

It is certified that error appears in the above-identified patent and that said Letters Patent is hereby corrected as shown below:

IN THE CLAIMS

In claim 1, at column 14, line 61, cancel the text beginning with "1. An apparatus, comprising:" to and ending "the subscriber attaches." in column 15, line 15, and insert the following claim:

--1. An apparatus, comprising:
a memory having datasets of subscribers registered therein, a respective dataset comprising an identification of a respective subscriber and a profile associated to the respective subscriber, the profile comprising at least an indication of whether a single-radio voice call continuity handover is permitted for the respective subscriber,
a transceiver, configured to receive information and to send information, and
a processor configured to write datasets into and read datasets from the memory,
wherein the processor, responsive to receiving information that a subscriber registered in the memory attaches to a network, reads out at least the indication of whether a single-radio voice call continuity handover is permitted for the subscriber, and the transceiver is configured to send the indication of whether a single-radio voice call continuity handover is permitted for the subscriber to a mobility management entity of the network, and the indication of whether a single-radio voice call continuity handover is permitted for the subscriber is stored per network to which the subscriber attaches.--

In claim 2, at column 15, line 16, cancel the text beginning with "2. An apparatus, comprising:" to and ending "the indicated type." in column 15, line 33, and insert the following claim:

--2. An apparatus, comprising:
a transceiver, configured to receive information and to send information,
wherein the transceiver, responsive to receiving an indication of whether a single-radio voice call continuity handover is permitted for a subscriber, is configured to send the indication to an access network in which a terminal of the subscriber currently camps, and the transceiver is configured to receive information indicating a type of handover to be performed for the subscriber's terminal, and Signed and Sealed this
Seventh Day of June, 2016

Michelle K. Lee
*Director of the United States Patent and Trademark Office*

CERTIFICATE OF CORRECTION (continued)
U.S. Pat. No. 8,665,823 B2

IN THE CLAIMS (continued)

the apparatus further comprising
   a processor, responsive to an indication of a type of handover to be performed for the subscriber's terminal, is configured to perform a handover according to the indicated type of handover, wherein the processor, according to the indicated type of handover, controls the transceiver to forward a handover request to an entity capable of handling the handover according to the indicated type.--

In claim 4, at column 15, line 41, cancel the text beginning with "4. An apparatus, comprising:" to and ending "the ongoing session." in column 16, line 3, and insert the following claim:

--4. An apparatus, comprising:
   a transceiver configured to receive information and to send information, and
   a processor configured to process received information and to output processing results,
   wherein the processed information comprises at least
       an indication of whether a single-radio voice call continuity handover is permitted for a respective subscriber's terminal,
       an indication of whether the respective subscriber's terminal is capable to participate in the single-radio voice call continuity handover,
       an indication of whether respective access network entities are capable to participate in the single-radio voice call continuity handover and/or capable to handle packet switched services,
       and an indication of a service domain of a service provided to the respective subscriber's terminal in an ongoing session,
   wherein the processor is configured to output as a processing result, a list of target access network entities eligible in a network for handover for the respective subscriber's terminal, and the transceiver is configured to send the list of target access network entities to the respective subscriber's terminal that has the ongoing session.--

In claim 5, at column 16, line 4, cancel the text beginning with "5. An apparatus according to claim 4" to and ending "the selected access entity." in column 16, line 8, and insert the following claim:

--5. An apparatus according to claim 4, wherein
   the transceiver is configured to receive information on one or more selected access network entities, and
   the processor is configured to initiate a handover of applicable handover type towards the selected access entity.--

In claim 6, at column 16, line 9, cancel the text beginning with "6. An apparatus, comprising:" to and ending "to which the subscriber attaches." in column 16, line 36, and insert the following claim:

--6. An apparatus, comprising:
   IN THE CLAIMS (continued)

CERTIFICATE OF CORRECTION (continued)
U.S. Pat. No. 8,665,823 B2 a transceiver configured to receive information and to send information, and a processor configured to process received information and to output processing results, wherein the processed information comprises at least an indication of whether a single-radio voice call continuity handover is permitted for a respective subscriber's terminal, an indication of whether the respective subscriber's terminal is capable to participate in the single-radio voice call continuity handover, an indication of whether respective access entities are capable to participate in the single-radio voice call continuity handover and capable to handle packet switched services, an indication of a service type provided to the respective subscriber's terminal in an ongoing session, and an indication of measurement results of measurements conducted on access entities wherein the processor is configured to output as a processing result, a selected access network entity elected by the processor as a handover target for the respective subscriber's terminal and to initiate a handover of applicable handover type towards the selected access network entity, and the indication of whether a single-radio voice call continuity handover is permitted for the respective subscriber's terminal is stored per network to which the respective subscriber's terminal attaches.--

In claim 7, at column 16, line 37, cancel the text beginning with "7. A method, comprising:" to and ending "which handover to initiate." in column 16, line 47, and insert the following claim:

--7. A method, comprising:

enabling inter-domain handover in a packet-switched (PS) based radio access network by identifying which potential handover to prepare and which handover to initiate, between either of PS-PS or single-radio voice call continuity, wherein the identifying is based on checking:

(1) a user equipment's single-radio voice call continuity capabilities, (2) a single-radio voice call continuity indication from a mobility management entity, (3) an active voice-over-internet-protocol bearer, and (4) a target cell's capabilities, and configuring a processor to output, as a processing result, which potential handover to prepare and which handover to initiate.--

In claim 8, at column 16, line 48, cancel the text beginning with "8. A computer program" to and ending "to initiate." in column 16, line 61, and insert the following claim:

--8. A computer program product, embodied on a non-transitory computer readable medium, comprising software code portions, which, when executed by a processor:

enable inter-domain handover in a packet-switched (PS) based radio access network by identifying which potential handover to prepare and which handover to initiate, between either of PS-PS or single-radio voice call continuity, wherein the identifying is based on checking:

(1) a user equipment's single-radio voice call continuity capabilities, (2) a single-radio voice call continuity indication from a mobility management entity, IN THE CLAIMS (continued)

CERTIFICATE OF CORRECTION (continued)
U.S. Pat. No. 8,665,823 B2

(3) an active voice-over-internet-protocol bearer, and
        (4) a target cell's capabilities; and
    configure the processor to output, as a processing result, which potential handover to prepare and which handover to initiate.--